No. 751,009. PATENTED FEB. 2, 1904.
H. S. PUTERBAUGH & W. H. KRESSLER.
HANDLE ATTACHMENT FOR DEMIJOHNS, &c.
APPLICATION FILED SEPT. 19, 1903.
NO MODEL. 2 SHEETS—SHEET 1.
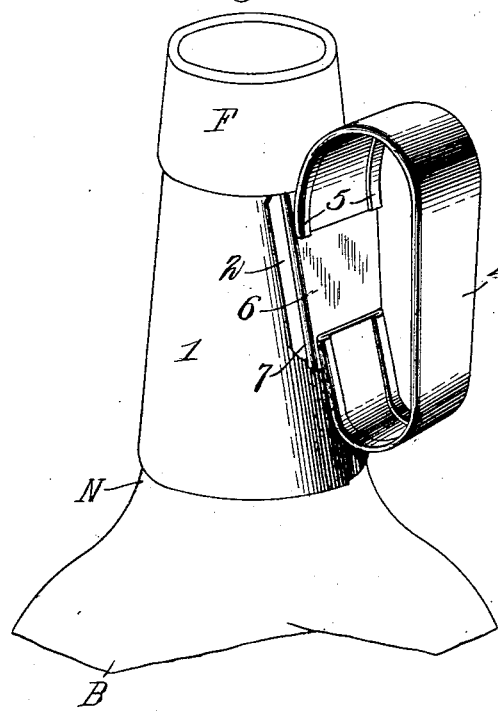
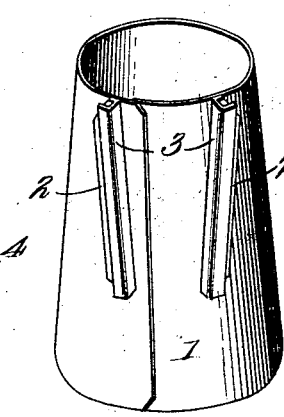
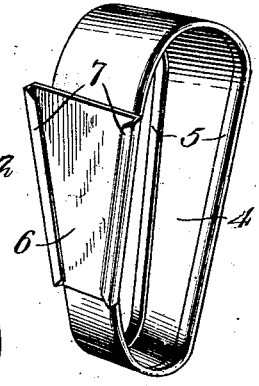
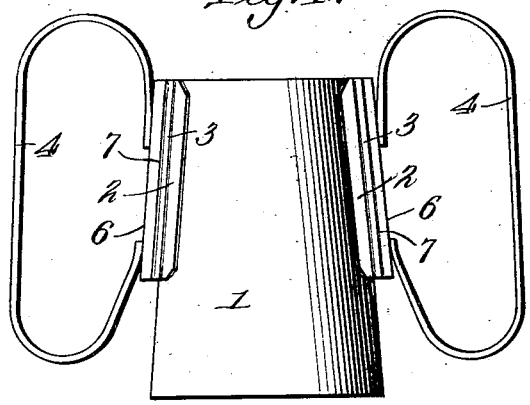
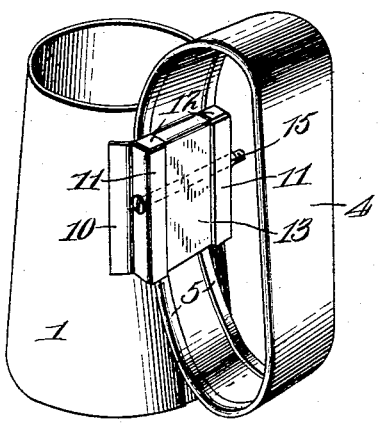
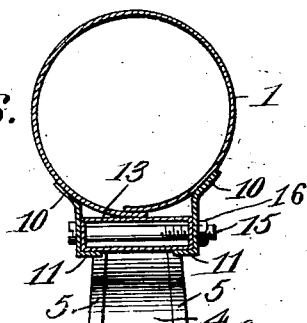
Witnesses
E. F. Stewart
Baxter Morton
Harry S. Puterbaugh
William H. Kressler, Inventors
by C. A. Snow & Co.
Attorneys

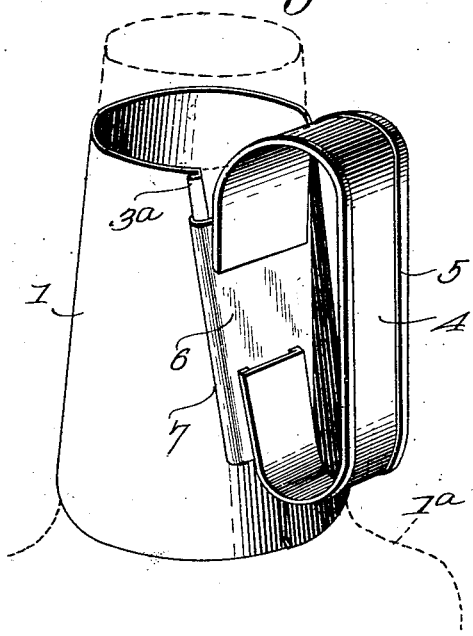
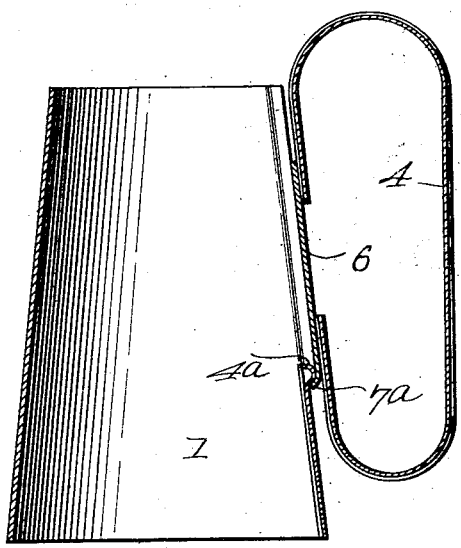
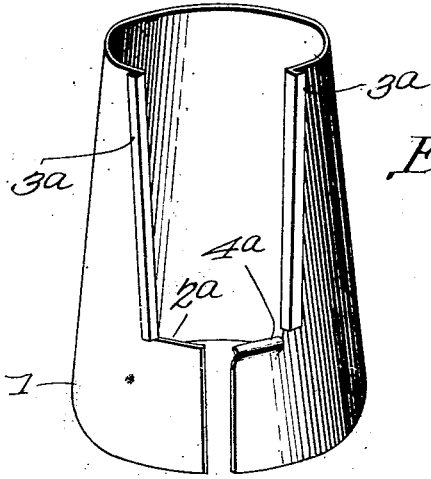
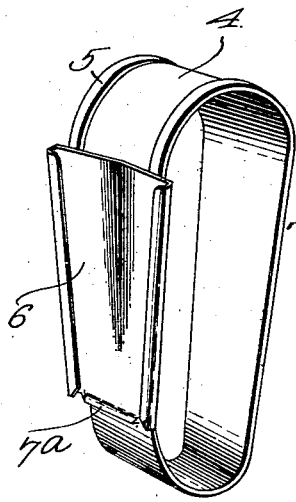

No. 751,009. Patented February 2, 1904.

UNITED STATES PATENT OFFICE.

HARRY S. PUTERBAUGH AND WILLIAM H. KRESSLER, OF EAST STROUDSBURG, PENNSYLVANIA.

HANDLE ATTACHMENT FOR DEMIJOHNS, &c.

SPECIFICATION forming part of Letters Patent No. 751,009, dated February 2. 1904.

Application filed September 19, 1903. Serial No. 173,907. (No model.)

*To all whom it may concern:*

Be it known that we, HARRY S. PUTERBAUGH and WILLIAM H. KRESSLER, citizens of the United States, residing at East Stroudsburg, in the county of Monroe and State of Pennsylvania, have invented a new and useful Handle Attachment for Demijohns, &c., of which the following is a specification.

This invention relates to handle attachments for demijohns, bottles, jars, and other vessels of similar character, and has for its object to provide a handle which may be easily applied to or removed from a demijohn or other similar vessel and which is especially adapted to facilitate the handling of large and unwieldy vessels which would otherwise be much more difficult to handle.

A further object of the invention is to provide an easily-attachable handle for vessels of the character specified which will be characterized by means for holding the handle in positive association with the neck of the vessel, so that the handle cannot be accidentally detached.

With the objects above mentioned and others in view the invention consists in the novel construction hereinafter described, illustrated in the accompanying drawings, and particularly specified in the appended claims.

In the drawings, Figure 1 is a view in perspective of a demijohn with one form of the handle attachment applied thereto. Fig. 2 is a view in side elevation of the band to encircle the neck of the demijohn. Fig. 3 is a view in elevation of the handle separate from the band. Fig. 4 is a view of a double-handle attachment. Fig. 5 is a view of a modified form of handle attachment. Fig. 6 is a sectional view in the horizontal plane of the bolt in Fig. 5. Fig. 7 is a view in perspective of a modified form of the invention. Fig. 8 is a vertical section through the modified form of the invention shown in Fig. 7. Figs. 9 and 10 are detail views of the parts of the modified form of the invention shown in Figs. 7 and 8.

Referring to the drawings, in which corresponding parts are designated by similar characters of reference, and having special reference to Figs. 1, 2, and 3, B designates the body of the demijohn, from which rises a neck N, having at the top a flange F. Around the neck and under the flange is fitted the band 1 of the attachment, which is formed, preferably, of thin sheet metal, such as tinned or japanned iron. The band is cut to fit closely around the neck and has its end portions slightly overlapped, as seen in Fig. 2. Adjacent to each of the ends there is rigidly attached, by riveting, soldering, or otherwise, a narrow strip 2 of sheet metal, which is bent so as to present an outwardly-disposed flange 3. The strips 2 are so applied to the band that when the band is in position upon the neck of a vessel the strips converge downwardly, as shown in Fig. 2.

The handle shown in Fig. 3 comprises a loop 4, made of any suitable material, as sheet metal, with the edges overturned to form beads 5, and a plate 6, to which the ends of the loop 4 are permanently secured in any suitable manner. The plate 6 tapers toward its lower end and has its lateral edges overturned to form guides 7, adapted to receive and jam against the outwardly-disposed flanges 3 upon the strips 2.

To apply the handle just described, the band will first be fitted around the neck of the vessel and held in close contact therewith, so bringing the strips 2 close enough together for the lower ends of the strips to pass readily into the upper ends of the guides 7. The handle will then be forced upwardly until the edges of the strips jam in the converging guides 7 and no further upward movement of the handle is possible. The handle attachment will then be secured upon the vessel in such manner that the use of the handle in lifting the vessel will have no other effect than to tighten the band upon the neck, so as to increase the effectiveness of its grip thereon.

In Fig. 4 the band is shown as provided with two pairs of strips 2, one pair being placed adjacent to the ends of the band, as above described, and the other pair being placed near the middle of the band, so that when the band is in position upon the neck of a vessel a supplementary handle exactly similar to that already described may be brought into engagement with the supplementary strips and so afford means for using both hands in handling a vessel of very large size.

In Figs. 5 and 6 the band 1 is shown as provided near its end with two strips 10 of sheet metal, having inwardly-bent edges 11 and overturned tops 12, which are adapted to fit over a hollow block 13, to which an ordinary handle-loop 14 is fastened in any preferred manner. The strips 10 and the hollow block 13 are pierced with suitably-placed openings for the passage of a small bolt 15, and when the band and handle are properly positioned the bolt may be passed through the openings provided therefor and secured by means of an ordinary nut 16, which will serve to draw the strips 10 into close contact with the sides of the hollow block 13.

In Figs. 7, 8, and 9 there is illustrated another modification of the invention, in which the structure is somewhat simplified. In this modified form of the invention the band to surround the neck of the demijohn or other vessel is designated $1^a$, and each end of the band is cut away at $2^a$, as shown, and the edges of the band on either side of the space cut away are bent outward to form flanges $3^a$, which converge toward their lower end, as do the flanges 3 in the first form of the invention shown. At the bottom of the space cut away at one end of the band there is formed a small bead $4^a$, the counterpart of which is not shown in the other forms of embodiment of the invention. The handle employed in connection with the band $1^a$ is similar to the handle described as used with the first form of band and comprises a loop 4, with overturned edges 5, and a downwardly-tapering plate 6, with inwardly-bent edges to form guides 7; but at the bottom of the plate 6 the material thereof is bent inward to present a lip $7^a$ for engagement with the bead $4^a$ already described. When the band $1^a$ is placed around the neck of a demijohn, which permits the ends of the band to overlap to a considerable extent and causes the flanges $3^a$ to lie close together, the upward movement of the handle as the guides 7 are brought into engagement with the flanges will be limited by the contact of the lip $7^a$ at the bottom of the plate 6 with the bead $4^a$ on the band, so that too much upward movement of the handle will be prevented. In this modified form of the invention the possibility of accidental detachment of flanges from the band is entirely prevented, while in the first form of the invention, in which the flanges are formed upon strips attached to the band by soldering or otherwise, such an accident might occur.

From the foregoing description and the accompanying drawings it will be seen that the handle attachment may be easily and quickly applied to any vessel of suitable form and proportion and as easily detached when desired. It will also be observed that the mode of securing the attachment upon the vessel is such as to render accidental detachment of the handle practially impossible.

While we have described and shown the preferred forms of embodiment of the invention, it will be readily seen that various changes in the structural details may be made without departing from the spirit of the invention, and the right to make such changes is reserved.

Having described the construction and use of our invention, what we claim as new, and desire to secure by Letters Patent, is—

1. A device of the character described comprising a band to encircle the neck of a vessel, a handle, and means for connecting the band and the handle and drawing the ends of the band together.

2. A device of the character described comprising a neck-encircling band, a handle, and interengaging members on the band and handle for tightening the band and holding the handle in association therewith.

3. A device of the character described comprising a neck-encircling band, a handle, and wedging devices upon the handle and the band for connecting the handle with the band and tightening the band upon the neck of a vessel.

4. A device of the character described comprising a neck-encircling band, a handle, a downwardly-tapering socket on the handle, and members on the band near the ends for engagement with said socket.

5. A device of the character described comprising a neck-encircling band, converging strips with outwardly-turned edges secured upon said band, a handle, and a plate attached to said handle and having overturned edges forming a downwardly-tapering socket for the reception of the outwardly-turned edges of said strips.

In testimony that we claim the foregoing as our own we have hereto affixed our signatures in the presence of two witnesses.

HARRY S. PUTERBAUGH.
WILLIAM H. KRESSLER.

Witnesses:
  M. L. HUTCHINSON,
  B. L. SHAFER.